May 16, 1939.  L. J. LARSON  2,158,799
METHOD OF WELDING
Filed March 4, 1936

INVENTOR.
Louis J. Larson
BY
ATTORNEY.

Patented May 16, 1939

2,158,799

UNITED STATES PATENT OFFICE 2,158,799

METHOD OF WELDING

Louis J. Larson, Milwaukee, Wis., assignor to A. O. Smith Corporation, Milwaukee, Wis., a corporation of New York Application March 4, 1936, Serial No. 67,142

7 Claims. (Cl. 219—10)

This invention relates to a method of welding and more particularly to the welding of the seams in alloy sheet linings over steel or alloys of other composition.

In the construction of lined pressure vessels such as are used in the oil refining and chemical industries the vessel is generally constructed from heavy plates of ordinary low carbon steel welded together and is generally lined with a corrosion-resisting alloy sheet welded thereto. A construction generally employed is that illustrated in U. S. Letters Patents Nos. 1,680,276 and 1,840,305 issued to Orrin E. Andrus and Sune Hermanson for Oil refining stills.

One of the problems encountered in the construction of lined vessels as above lies in providing a weld at the seams between the alloy lining sheets which will have characteristics as to corrosion resistance similar to those of the liner sheets. This problem arises by reason of the fact that in the fabrication of the vessel it is generally necessary to leave a space between the edges of the liner sheets forming a groove into which special alloy weld metal is deposited, and the additional fact that the bottom of this groove is not formed of the alloy of the liner sheet but is formed of the low carbon steel of the vessel wall and tends to dilute the deposit as the latter is deposited in a molten state in the groove.

The object of this invention is to provide a method of depositing the alloy at the seams or in openings in the liner sheet and obtaining a deposit which will have a resistance to corrosion substantially equal to or greater than the liner sheet, not only at the surface of the deposit, but for substantially the entire thickness of the deposit.

The invention will be better understood by reference to the accompanying drawing which illustrates preferred embodiments of the same.

Figure 1 of the drawing is a perspective view of a section of the cylindrical body portion of a lined vessel;

Figure 1:
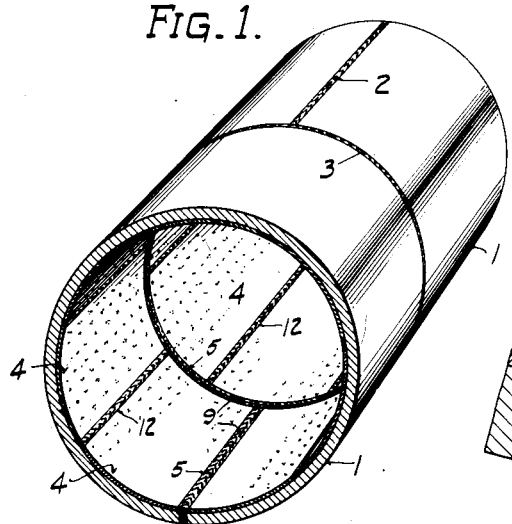
Figure 2:
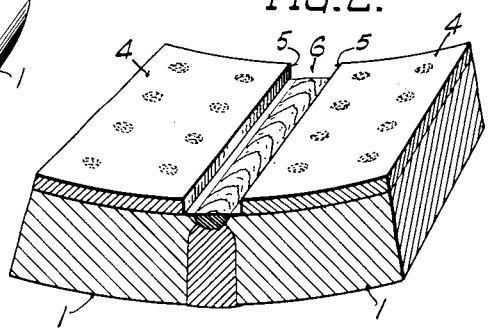
Fig. 2 is a perspective view showing a portion of the longitudinal weld in the vessel wall prior to the deposit of alloy weld metal at the seam.

Referring to Figs. 1 to 4, the vessel is constructed of heavy plates 1 of plain carbon steel curved into rings and welded on longitudinal seams 2 and circumferential seams 3, as shown. Liner sheets 4 are welded to the interior of the plates preferably by electric resistance spot welding at close and contiguous points as described in the patents referred to above. The weld between edges 5 of adjacent liner sheets 4 may occur either over the main welded seams 2 and 3 of the vessel wall or over the body of one of the steel plates 1. The edges 5 of the sheets 4 are generally spaced a substantial distance apart where they approach the main welded seams 2 and 3 of the vessel wall, but are spaced at a less distance where the seams between alloy sheets occur over the body of the plates 1. The groove 6, formed at the edges of the liner sheets 4, is bounded by a bottom of plain carbon steel and side walls of special alloy, usually a chromium nickel steel or a chromium steel. This is the case irrespective of whether the groove falls over the body of a steel plate or over a weld between two steel plates.

Alloy weld metal is deposited in the groove by means of an electric arc and is fused with the metal of the bottom and side walls of the groove to provide a continuous corrosion-resistant liner for the vessel. The metallic arc process, employing a covered metal weldrod of alloy composition generally similar to that of the sheets 4, is employed for depositing and fusing the alloy in the groove 6. The thickness of the alloy sheets 4 and consequent depth of the groove 6 is often less than $\frac{3}{16}$", making it possible to deposit the requisite thickness of alloy deposit with one pass of the weldrod or electrode.

In using an electrode of the same alloy composition as the sheets 4 and depositing a layer of the full depth of the groove with one pass, the result has been to obtain a weld which was so diluted by fusion of the plain carbon steel into it that the corrosion-resisting properties of the weld were, under certain circumstances, greatly reduced as compared to those of the alloy sheets 4.

It has been suggested to overcome this difficulty by employing a multiple layer deposit using a similar electrode, but in using two separate passes of the electrode along the groove to deposit the requisite thickness of metal, while the dilution or contamination of the uppermost layer was less, making for better initial corrosion-resisting properties, the first or lowermost layer of deposit was greatly diluted and the net result was that the actual protection against corrosion was much less in comparison to the protection furnished by the sheets 4.

Figure 3:
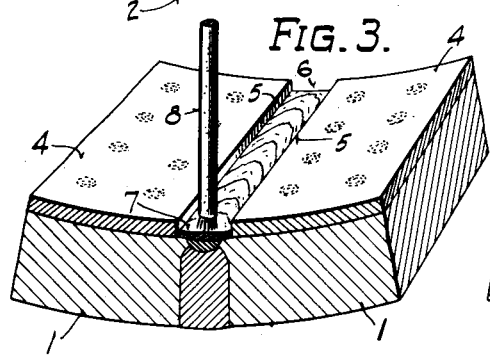
Fig. 3 is a perspective view of the parts shown in Fig. 2 showing the depositing of the first layer of alloy.
Figure 4:
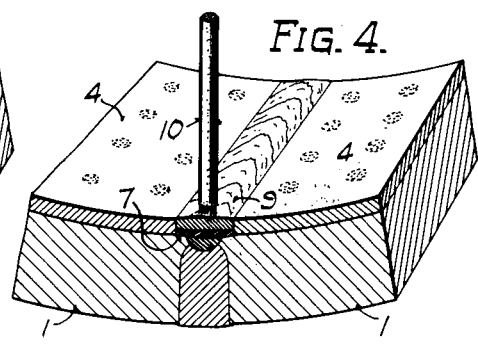
Fig. 4 is a similar view showing the completed deposit.

The present invention provides a method for entirely overcoming the difficulty. In carrying out the invention as illustrated in Figs. 3 and 4, it is preferable to make two passes of the electrode to provide a deposit of the requisite thickness to completely fill the groove 6. The first layer 7 of deposited weld metal is applied from an electrode 8 having a higher alloy content than that of the alloy sheets 4 and when fused with the plain carbon steel of the plates 1 and the alloy side walls of the groove 6 it will have a final alloy content approximating or even exceeding the alloy content of the sheets 4. The second layer 9 of the deposited weld metal is applied from an electrode 10 having an alloy content approximating that of the alloy sheets 4. This is practicable since the second layer is deposited in a groove having all of its boundaries of alloy metal that will not effect a reduction in alloy content of the deposit. The result is a deposit of the required characteristics as to corrosion resistance for the full thickness of the sheets 4.

The invention has been applied in the fabrication of vessels lined with a number of different alloys. One specific application has been in the welding of alloy lining sheets composed of a chrome-nickel steel approximating about 18% chromium and 8% nickel in alloy composition. While the electrode 10 for the second layer of deposit had the same composition as the sheet, the electrode 8 for the first layer of deposit had an alloy content approximating 24% of chromium and 12% of nickel. The additional alloy content of the weldrod insured that the deposited metal had an alloy content, after dilution with the plain carbon steel from the vessel wall, approximating to that of the liner sheet.

Another application of the invention has been in the welding of chromium steel liner sheets having a chromium content approximating from 16% to 17%. In this case the electrode 8 had an alloy content approximating 25% of chromium. The desired alloy content will usually be between 30% and 60% greater than the alloy content of the liner sheets or material.

Figure 5:
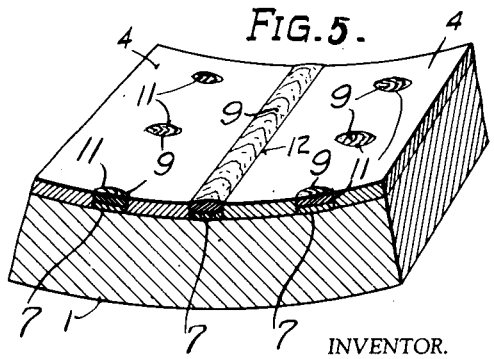
Fig. 5 is a perspective view of a portion of the cylindrical vessel showing the application of the invention in the depositing of alloy in openings in the liner sheet and also in the groove between adjacent alloy sheets which meet over the body of a steel plate instead of over a weld between two plates.

In Fig. 5 the invention is shown as applied to the welding of the liner sheets to the vessel wall through openings as at 11. This is also adapted to patching the liner should such be necessary. Fig. 5 shows a groove 12 between two liner sheets which meet over the body of one of the steel plates 1 instead of over a weld between two plates. This groove can advantageously be made narrower than when the liner sheets meet over a weld between the carbon steel plates.

In some cases it has been found possible to incorporate the additional alloying elements in the correct amounts in the covering of the electrode. This avoids having additional melts of different alloy steel compositions made up for making the electrodes and provides a flexibility in control of shop practice which is desirable. When this is done it may be necessary to put an excess of the powdered alloying metal in the covering in order to allow for part of the metal escaping and not being included in the final deposit. Certain alloying ingredients are known to be difficult to transfer through the welding arc. However, chromium and nickel are not considered difficult to transfer from the covering into the weld deposit and these elements may be used in either their pure state, or as oxides or ferro-alloys in the covering.

While the process has been directed to the lining of pressure vessels for protecting the same from corrosion, it may be employed for various purposes and may be modified in various ways within the scope of the invention as defined in the accompanying claims.

I claim:

1. The method of securing a sheet of alloy to a backing plate of lower alloy content which comprises partially covering the surface of the backing plate with the alloy sheet so as to leave a groove formed by the backing plate and the edges of the alloy sheet at places where the alloy sheet does not cover the backing plate, depositing fused metal in said groove from a weldrod having a higher alloy content than the alloy sheet so as to partially fill the groove, and thereafter depositing in the partially filled groove fused metal from a weldrod having approximately the same composition as the alloy sheet.

2. The method of electrically arc welding a sheet of alloy to a backing plate of lower alloy content which comprises partially covering the surface of the backing plate with the alloy sheet so as to leave a groove formed by the backing plate and the edges of the alloy sheet at the places where the alloy sheet does not cover the backing plate, arc welding the edges of the alloy sheet to each other and to the backing plate by partially filling said groove with fused metal deposited from a fusible metallic electrode having an alloy content greater than that of the alloy sheet, and thereafter depositing in said partially filled groove fused metal from a fusible metallic electrode having a composition which approximates that of the alloy sheet.

3. In the method of electrically arc welding an alloy sheet to a backing plate of lower alloy content by depositing fused weld metal in a groove formed by the backing plate and the edges of the alloy sheet, the improvement which comprises partially filling said groove with metal deposited from a fusible metallic electrode with a higher alloy content than the alloy sheet, and thereafter depositing fused metal in said partially filled groove by the use of a fusible metallic electrode having approximately the same composition as the alloy sheet.

4. In the method of electrically arc welding an alloy sheet to a backing plate of lower alloy content by depositing fused weld metal in a groove formed by the backing plate and the edges of the alloy sheet, the improvement which comprises partially filling said groove with metal deposited from a fusible metallic electrode with an alloy content 30% to 60% greater than the alloy content of the alloy sheet, and thereafter depositing fused metal in said partially filled groove by the use of a fusible metallic electrode having approximately the same composition as the alloy sheet.

5. In the method of electrically arc welding a sheet of corrosion-resistant alloy steel to a backing plate of carbon steel by depositing fused weld metal in a groove formed by the steel plate and the edges of the corrosion-resistant alloy sheet, the improvement which comprises partially filling said groove with weld metal deposited from a fusible metallic electrode having a higher alloy content than the corrosion-resistant alloy, and thereafter depositing in said partially filled groove weld metal from a fusible metallic electrode of approximately the same composition as the corrosion-resistant alloy sheet.

6. In the method of electrically arc welding a sheet of corrosion-resistant alloy steel to a backing plate of carbon steel by depositing fused weld metal in a groove formed by the steep plate and the edges of the corrosion-resistant alloy sheet, the improvement which comprises partially filling said groove with weld metal deposited from a fusible metallic electrode having an alloy content from 30% to 60% greater than the alloy content of the corrosion-resistant alloy sheet, and thereafter depositing in said partially filled groove weld metal from a fusible metallic electrode of approximately the same composition as the corrosion-resistant alloy sheet.

7. In a method of lining steel plates with corrosion-resistant alloy metal, the steps which comprise applying an electric arc to progressively heat the surface of the steel base plate, supplying to the arc alloying material having a percentage of an alloying ingredient higher than that desired in the finished lining, fusing the material by the heat of the arc with the steel base, the ingredients of the material supplied being proportioned to compensate for the fusion of the steel base therewith, thereafter applying an electric arc to progressively heat the surface of the fused alloy metal, supplying to said arc alloying metal of substantially the same alloy content as the metal already fused with the steel base and as in the desired finished lining, and fusing said last named metal with said previously fused metal to produce a multiple layer deposit of fused alloy metal of substantially uniform alloy content throughout its thickness and extent.

LOUIS J. LARSON.